(12) United States Patent
Clough

(10) Patent No.: US 6,514,641 B2
(45) Date of Patent: Feb. 4, 2003

(54) BATTERY SEPARATOR CONTAINING EFFICIENCY IMPROVING ADDITIVES

(75) Inventor: Thomas J. Clough, Grover Beach, CA (US)

(73) Assignee: Ensci Inc, Pismo Beach, CA (US)

( * ) Notice: Subject to any disclaimer, the term of this patent is extended or adjusted under 35 U.S.C. 154(b) by 0 days.

(21) Appl. No.: 09/781,478

(22) Filed: Feb. 9, 2001

(65) Prior Publication Data

US 2001/0009734 A1 Jul. 26, 2001

Related U.S. Application Data

(62) Division of application No. 09/045,725, filed on Mar. 20, 1998, now Pat. No. 6,350,541.

(51) Int. Cl.⁷ .................................................. H01M 2/16
(52) U.S. Cl. ....................... 429/248; 429/247; 429/228; 429/225; 429/204; 429/145
(58) Field of Search .................................. 429/248, 247, 429/225, 204, 228, 145

(56) References Cited

U.S. PATENT DOCUMENTS

| | | | |
|---|---|---|---|
| 4,031,038 A | | 6/1977 | Grinstead et al. |
| 4,098,867 A | | 7/1978 | Grinstead et al. |
| 4,383,011 A | * | 5/1983 | McClelland et al. ........ 429/149 |
| 4,383,104 A | | 5/1983 | Sasaka et al. |
| 4,414,183 A | | 11/1983 | Sasaka et al. |
| 4,529,677 A | | 7/1985 | Bodendorf |
| 4,559,216 A | | 12/1985 | Nagai et al. |
| 5,221,587 A | | 6/1993 | Böhmstedt et al. |
| 5,281,631 A | | 1/1994 | Horwitz et al. |
| 5,376,477 A | * | 12/1994 | Aidman et al. ............. 429/141 |
| 5,449,462 A | | 9/1995 | Horwitz et al. |
| 5,582,737 A | | 12/1996 | Gula et al. |
| 5,989,750 A | * | 11/1999 | Ohba et al. ............ 264/331.11 |

FOREIGN PATENT DOCUMENTS

| | | |
|---|---|---|
| FR | 2440085 | 5/1980 |
| JP | 54-156139 | 12/1979 |

* cited by examiner

Primary Examiner—Laura Weiner
(74) Attorney, Agent, or Firm—Frank J. Uxa

(57) ABSTRACT

A recombinant battery element of a lead acid battery including a negative plate, a positive plate and a separator having an additive associated with the separator that improves the overall efficiency of the lead acid battery.

11 Claims, No Drawings

BATTERY SEPARATOR CONTAINING EFFICIENCY IMPROVING ADDITIVES

RELATED APPLICATIONS

This application is a division application of application Ser. No. 09/045,725, filed Mar. 20, 1998 now U.S. Pat. No. 6,350,541. This earlier filed application is incorporated in its entirety herein by reference.

BACKGROUND OF THE INVENTION

The present invention relates to an improved lead acid battery element containing metal impurity inhibiting polymeric additives, which are added to the positive active material, negative active material and/or battery separator to inhibit the detrimental effects of certain metals on the efficiency of a lead acid battery, particularly the negative plate battery element and to macroporous additives that enhance active material utilization efficiency and improvement in the utilization of sulfuric acid electrolyte necessary for the discharge reaction of a lead acid battery.

Further the present invention relates to a recombinant battery separator element, which improves utilization efficiency of the sulfuric acid electrolyte in a valve regulated recombinant lead acid battery. In brief the separator battery elements include the addition of porous containing particle additives to the separator of a valve regulated recombinant lead acid battery to improve the overall utilization efficiency and the utilization of sulfuric acid electrolyte during charge/discharge of the battery.

Separators used for valve regulated or as also referred to sealed lead-acid batteries operating on the oxygen recombination principle, i.e. oxygen recombinant batteries, typically operate with a limited amount of sulfuric acid electrolyte, i.e. only having electrolyte within the separator and the pores of the negative and positive active material. Unlike flooded batteries which have excess electrolyte and generally means for water addition, the design of valve regulated recombinant batteries do not have provisions for the addition of water during the life of the battery. Further, the battery is designed so that the oxygen generated at the positive electrode during charging is recombined to form water at the negative electrode. Separators used for valve regulated lead acid batteries typically include one or more layers of highly absorptive porous mats typically having a mix of fibers. The porosity of the separator is designed such to allow oxygen to transport directly through the separator for reaction at the negative electrode. The design requirements of limited sulfuric acid electrolyte and oxygen recombination at the negative electrode gives rise to a number of serious problems affecting valve regulated lead acid batteries including electrolyte stratification in the separator particularly in the vertical direction and excessive transport of oxygen to the negative plate before the negative plate can be fully recharged. Thus, published studies have shown that the stratification of the electrolyte brings about a difference in the electrolyte concentration between the upper and lower portions of the separator thereby reducing the amount of sulfate ion required for the electrochemical reactions during discharge of the battery, i.e. both positive and negative plate active material are converted to lead sulfate. Further, the properties of the separator can affect the height at which the electrolyte rises and the speed or rate of electrolyte absorption and diffusion both upward and downward particularly during electrolyte initial fill of the battery and sulfate reaction during discharge particularly high rate discharges. Thus, the separator for valve regulated batteries should minimize stratification effects particularly during repeated charge/discharge cycles and provide for rapid wicking of the electrolyte during fill of the battery. Further, the separator should allow control of the oxygen from the positive electrode to the negative electrode in order to improve the charging efficiency of the negative plate as it approaches full charge. In addition the separator must provide for controlled wetability in order to minimize stratification, provide for ease of electrolyte filling and to control oxygen recombination transport for improved negative plate charging.

Metal impurities can be introduced into a lead acid battery through the use of any of the materials used in the manufacture of the battery. For example, metal impurities can be introduced in the lead and leady oxides used in the manufacture of the active material, the materials of construction including the lead grids, alloying agents, electrolyte and water. Nearly all metallic impurities, if they are nobler than lead, have a smaller hydrogen overvoltage than pure lead. Therefore, they increase hydrogen evolution even if they are deposited in minute concentrations on the surface of the negative plates. These metals cause a continued gas evolution even after charging is completed. Hydrogen is evolved on the deposited metal with low hydrogen overvoltage, which can be short-circuited with lead. The effect of metal on the gassing particularly postcharge gassing decreases in the following sequence: Pt, Au, Te, Ni, Co, Fe, Cu, Sb, Ag, Bi and Sn. The presence of 0.3 ppm of platinum in the acid can cause a doubling of the self-discharge rate. Tin can produce this effect at 0.1%. Freshly deposited antimony is especially active. Besides the discharge of the negative plates with concomitant hydrogen evolution, these materials also move the end of charge voltage of the negative plates toward more positive values. The hydrogen evolution increases with rising acid density. Because the hydrogen overvoltage decreases with temperature, the self-discharge increases.

SUMMARY OF THE INVENTION

A new battery element which inhibits the detrimental effect of soluble metal impurity on the negative plate has been discovered. In brief, the battery elements include the addition of an organic polymer having functional groups with a preferential affinity for the metal impurity in the cation or anion state, to the positive active material, the negative active material or the separator which separates the positive and negative plates within a lead acid battery and which typically is a reservoir for sulfuric acid electrolyte.

A new recombinant battery separator element, which improves utilization efficiency of the sulfuric acid electrolyte in a lead acid battery, has been discovered. In brief the separator battery element includes the addition of porous organic particle additives having functional groups, which associate with the sulfuric acid electrolyte to control oxygen diffusion through the separator, improve electrolyte distribution in the separator and improve overall battery utilization efficiency, particularly the utilization of sulfuric acid electrolyte during repeated charge/discharge cycles of the battery.

A new battery element, which improves utilization efficiency of the active material in a lead acid battery has been discovered. In brief, the battery elements include the addition of macroporous containing particle additives to the active material in the positive or negative plates of a lead acid battery to improve overall utilization efficiency and the utilization of sulfuric acid electrolyte during discharge of the battery.

A new recombinant battery separator element, which improves utilization efficiency of the battery, particularly the utilization of the sulfuric acid electrolyte in a lead acid battery, has been discovered. In brief the separator element includes the addition of macroporous containing particle additives to the separator of a lead acid battery to improve overall battery utilization efficiency, particularly the utilization of sulfuric acid electrolyte during repeated charge/discharge cycles of the battery.

DETAILED DESCRIPTION OF THE INVENTION

In one broad aspect, the present battery elements comprise the addition of an organic polymer containing functional groups with a preferential affinity for metal impurity in the cation or anion state to the positive active material, the negative active material and/or the separator which separates the positive plates from the negative plates in a lead acid battery. In a preferred embodiment, the organic polymers are porous, i.e. the porosity of the polymer allows the soluble metal impurity in the electrolyte to contact both the outer surface of the polymers and the internal surfaces created by the porosity of the organic polymers. The functional groups having a preferential affinity for metal impurity include both functional groups on the outer surface and internal surfaces in contact with soluble metal impurity in the electrolyte. The metal impurity inhibiting additives are typically incorporated into the negative active material, the positive active material and/or the separator in an amount sufficient to inhibit the detrimental effects of metal impurity on the negative plate.

In another broad aspect, the present separator battery elements comprise the addition of porous organic polymer particles containing functional groups, which associate with the sulfuric acid electrolyte to control oxygen transport from the positive to the negative plate during charging and provide for improvement in electrolyte distribution in the separator. In a preferred embodiment the particles have larger diameters and larger pores at the acid molarity concentrations of discharge when compared to the size of the particles at the acid molarity at full charge. In a further preferred embodiment the electrolyte contacts both the outer surfaces of the polymers and the internal surfaces created by the porosity of the organic polymers. The functional groups having a preferential affinity for sulfuric acid electrolyte include both functional groups on the outer surface and internal surfaces in contact with the electrolyte. The particles are incorporated in the separator in an amount sufficient to control the oxygen transport through the separator and improve overall electrolyte utilization efficiency in the battery.

In another broad aspect, the present battery elements comprise the addition of macroporous additives to the active material present in the positive and/or negative plates in a lead acid battery. In a further preferred embodiment, the macroporous particles have a reduced affinity for bonding with the active material in the positive and negative plates, i.e. a substantially reduced bonding of lead ion with the polymeric functional groups.

In another broad aspect, the present recombinant separator elements comprise the addition of elongated macroporous additive particles to the separator to improve overall electrolyte distribution in the separator and improve overall utilization of sulfuric acid electrolyte in the battery. In brief, the separator elements include the addition of macroporous containing particles to reduce electrolyte stratification in the separator and improve overall distribution and rate of distribution of the electrolyte in the separator. In a further preferred embodiment, the macroporous particles have controlled surface wetability, preferably a combination of hydrophilic and hydrophobic surface properties to improve overall distribution and rate of distribution of the electrolyte in the separator.

As set forth above, metal impurities can be introduced into the battery during the battery manufacturing process, particularly in the starting materials used for battery manufacture. Many of the metal impurities can exist in the anion or cation form i.e. a negative or positive charge respectively in sulfate solutions such as that represented by sulfuric acid electrolyte. Depending on the molarity of the sulfuric acid electrolyte and the metal impurity, such cation/anion forms can change as the molarity changes. Depending on such sulfuric acid molarity, it is believed that platinum, gold, thallium, nickel, cobalt, iron, copper, antimony, silver, bismuth and tin can exist as anions even though such existence as anions may be weak or unstable. Further, such anion forms may predominant at the sulfuric acid electrolyte concentrations, which exist after battery charging. One of the particularly detrimental metal impurities is platinum.

As set forth above, such metal impurities can be introduced into the lead acid battery during manufacturing. In a number of battery designs, grid materials not having antimony as an alloying agent are used for battery manufacture. However, even in these types of batteries using nonantimony containing grids, antimony can be introduced as an impurity in the starting materials for battery manufacture including the starting lead and leady oxide type materials.

As set forth above, antimony, which is present in the positive grid as an alloying agent, can be oxidized and/or corroded to form a soluble antimony ion, which diffuses and/or migrates to the negative plate. Antimony at the negative plate can produce a number of detrimental problems such as self discharge and gassing particularly hydrogen formation. Antimony ion from the positive grid can exist in both the anion and cation form, i.e. a negative or positive charge respectively. It is believed that the form of the anion or cation is dependent on the oxidation state of the antimony, i.e. +3 or +5, the molarity of the sulfuric acid and the battery voltage. For example, it is believed that antimony can exist as $SbO2+$ cation and $SbO3-$ anion in the antimony +5 state and as $SbOSO4-$, $Sb(SO4)^{2-}$ $SbO2$ in the antimony +3 state. These +3 anion forms are believed to exist when the molarity of the sulfuric acid is greater than one but may not exist at the fully recharged battery voltage. In addition, it is believed that antimony may exist as $Sb+3$ or $SbO+$ in the antimony +3 state again depending on molarity and battery voltage. As set forth above, the sulfuric acid electrolyte participates in the discharge reactions taking place in the lead acid battery. Thus, the wt % sulfuric acid can decrease from 30–40 wt % sulfuric acid to from 10–14 wt % sulfuric acid depending on the type of battery design and the initial sulfuric acid concentration in the electrolyte. The amount of sulfuric acid remaining will be dependent on the percent of discharge of the battery with less sulfuric acid remaining when batteries are discharged to 80% or more.

The organic polymers having functional groups with a preferential affinity for metal impurities in the anion or cation state inhibit the detrimental effects of soluble metal impurity on the negative plate. While the exact mechanism of inhibition is not known, it is believed that the metal impurity anion or cation is bound by the functional group such as by the anion replacing the anion present on the functional group in an anionic polymer or by a cation replacing the cation when the organic polymer contains cation functional groups. Although anion and/or cation replacement is believed to be one mechanism for inhibiting the adverse effects of metal impurity ions, metal impurities can also form complexes and/or be solvated to inhibit the detrimental effect of metal impurities on the negative plate and such mechanisms are included in then the term inhibiting. One of the major discoveries of the battery elements of this invention is the inhibition of metal impurities over the varying sulfuric acid molarities and battery potentials (voltages) that occur during the charge discharge reactions in a lead acid battery. Further it has been discovered that the metal impurity which has been inhibited by the organic polymer additive is not substantially and detrimentally desorbed and/or released from the polymer under the sulfuric acid molarity and battery voltage conditions and changes in a lead acid battery, that is the metal impurity inhibition continues during a plurality of charge/discharge reactions within the battery.

As set forth above, the organic polymers containing functional groups can introduce cations and/or anions into the battery element which cations or anions can be displaced by the metal impurity anion and/or cation. Further, the affinity of the organic polymer having such metal impurity inhibiting functional groups have a stronger binding and/or complex formation and/or salvation of metal impurity ions when compared to any intermediate soluble lead ions such as lead +2 which may be formed during the conversion of solid lead, solid lead peroxide to insoluble lead sulfate. As is known by those having skill within the lead acid battery art, cations and/or anions which are displaced by metal impurity cations or anions should not introduce any substantial detrimental effects on battery performance.

As set forth above, one of the classes of organic polymers has functionality, which have affinity for metal impurity in the cation form. The metal impurity cation displaces the cation associated with the functional group. Typically, the cation displaced can be hydrogen ion or, for example, sodium ion. The organic polymers having such cation functionality can be further classified as strongly acidic cation polymers or weakly acidic cation polymers. Particularly preferred strongly acidic cation polymers are those containing sulfonic acid groups or their sodium salt i.e. sulfonic groups preferably in the hydrogen form. Typical examples of polymers containing the sulfonic acid and/or sulfonate functionality are those derived from polystyrene crosslinked divinylbenzene, phenol-formaldehyde polymers and other like aromatic containing polymers. As set forth above the organic polymer can have different functional groups such as functional groups containing strongly acidic functionality such as sulphonic and phosphonic functionality on the same organic polymer.

As set forth above, strongly acidic cation polymers are preferred for inhibiting the effects of metal impurities. A particularly preferred functionality on the polymer is phosphonic acid and/or phosphonate here in after referred to as phosphonic functionality. Typical examples of such functionality are:

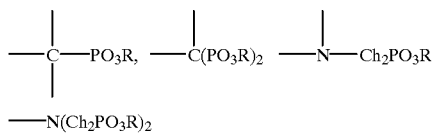

where R is typically hydrogen or sodium ion, preferably hydrogen.

In general the phosphonic functionality can be incorporated into the polymer matrix by chemical reaction including grafting of such functionality, on for example the aromatic portion of polystyrene and/or phenol-formaldehyde polymers. In addition, the functionality can be incorporated by the copolymerization unsaturated vinylmono or gem of phosphonic acid or ester monomers with other monomers patricularly styrene, with still other monomers such as acrylate or acrylovitrile together with a cross-linking agent such as divinylbenzene. A typical monomer used for such copolymerization is vinylidene diphosphonic acid or the ester thereof to produce gem phosphonic functionality. Further examples of such polymers are polymers having a plurality of amino alkylene, phosphonic acid or phosphonate associated with the organic polymer.

As set forth above bis-derivatives are also useful including imino-bis(methylenephosphonic acid). The particularly preferred functionality is amino methylelephosphonic acid groups on polystyrene cross-linked with divinylbenzene.

As set forth above, phosphonic functionality can be incorporated into the polymer by reaction with an existing polymermatrix or by copolymerization of for example a vinyl phosphonic monomer. A prefered polymer is one containing polymerized styrene monomer either as a home polymer or an inter polymer with other polymerized monomeric units. Such polymers containg polymerized styrene are generally referred to as polystyrene polymers.

As set forth above the organic polymer can have different functional groups such as functional groups containing strongly acidic functionality such as sulphonic and phosphonic functionality on the same organic polymer.

The weakly acidic cation polymers in general have carboxylic functionality and/or the sodium salt associated with the organic polymer. Typical examples of such polymers are those derived from unsaturated carboxylic acids such as acrylic, methacrylic or maleic crosslinked with another monomer such as divinylbenzene or ethylene dimethacrylate. The preferred organic polymers containing cation functionality are the strongly acidic cation polymers having sulfonic acid functionality.

As set forth above, the organic polymer can have functionality having a preferential affinity for soluble metal impurity anions, i.e. the anion associated with the functionality is displaced by the soluble metal impurity anion in the electrolyte. The organic polymers having anion functionality can have both strongly basic and weakly basic anion functionality. Typical examples of strongly basic anion containing functionality are those having an ammonium functionality associated with the organic polymer. As set forth above, the anion associated with the functionality, typically sulfate or chloride, is displaced by the metal anion within the electrolyte. Typical ammonium groups associated with the polymer include trimethyl ammonium ion and dimethylethanol ammonium ion. Other groups include isothiouronium and derivatives thereof. Typical examples of organic polymers are polystyrene cross-linked with divinylbenzene. The ammonium ion with an appropriate anion can be attached directly to, for example, the aromatic ring of the polystyrene or through, for example, a methylene bridge. Typical examples of weakly basic polymers having anion functionality are polymers, which contain tertiary aliphatic or aromatic aliphatic amine functionalities on the polymer such as polystyrene or a polyunsaturated carboxylic acids. Such polymers are typically cross-linked with a cross-linking agent such as the cross-linking agents referred to above. Further, the polymer basic anion functionality can be obtained through aliphatic polyamine condensation reactions to produce the organic polymer. Typically, the weak base anion resins contain primary, secondary and/or tertiary amine groups generally as a mixture. Typical examples of such amine groups are trimethyl amine and dimethylethanolamine. The preferred organic polymers having anion type functionality are the strongly basic anion containing functionality particularly for their strong binding and low release or desorption of metal impurity properties preferably having ammonium functionality, particularly for incorporation into the negative plates. Since the electrolyte in the lead acid battery is sulfuric acid, it is preferred to use sulfate as the anion to be displaced by metal anion.

As set forth above the organic polymers can contain primary secondary or tertiary amine groups including aliphtaic polyamine functionality. Further as set forth above, such organic polymers can contain aliphatic amine functionality. Further, as set forth above such polymers can contain amine functionality with acid functionality. Particularly preferred functionalities associated with the organic polymer which contain both amine and acidic functionality are those containing secondary and tertiary amine functionality and strong acid functionality, such as for example, the examples set forth above.

A particularly preferred class of aliphatic aromatic amine functionality are those having amino pyridine groups associated with the organic polymer. Examples of such groups can be represented by the formula.

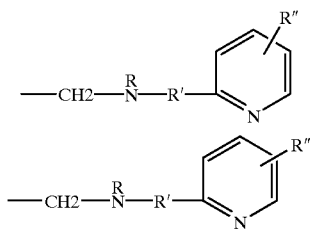

where in R is preferably an aliphatic substituent, an aliphatic polyamino substituent or a 2-picolene containing substituent R' is preferably alkylene, preferably methyleneand R" is a non-substantially interfering substituent, preferably hydrogen. Particularly preferred additives are organic polymers having functionality from 2-picolylamine, N-methly-2-picolylamine, N-2hydroxyethyl)-2-picolylamine, N-(2-methylaminoethyl)-2-picolylamine and bis-(2-picolyl) amine.

The aromatic aliphatic amine functionalities particularly the 2-picolylamine, such as bis-(2-picoly)amine, are particularly useful in inhibiting the detrimental effects of copper and nickel.

As set forth above the organic polymers can contain primary secondary or tertiary amine groups including aliphtaic polyamene functionality. Further as set forth above, such organic polymers can contain aliphatic amine functionality. Further, as set forth above such polymers can contain amine functionality with acid functionality. Particularly preferred functionalities associated with the organic polymer which contain both amine and acidic functionality are those containing secondary and tertiary amine functionality and strong acid functionality, such as for example, the examples set forth above.

The organic polymers having functional groups with affinity for metal impurity are typically within the particle size ranges, porosities, surface areas, additive concentration and such other physical properties set forth below with respect to porosity additives. The porosity of the preferred organic polymers can vary over a wide range such as within the ranges set forth below with respect to micro and macro porosity. The porosity of the preferred organic polymers is that which allows the metal impurity ion, cation and/or anion to permeate the organic polymer particle thereby affording good contact with the functional groups attached to the external and internal surfaces of the particles. The total displacement capacity of the organic polymer having such functional groups is typically greater than one milliequivalent of displaceable anion or cation per gram of polymer, preferably greater than three and still more preferably greater than five.

As set forth above, the porous organic polymers having functional groups can be incorporated into porous type separators such as porous mats or felts that are used in valve regulated recombinant batteries. The functional groups associate with the sulfuric acid electrolyte and change in particle size and pore size as the acid molarity in the battery changes during discharge and charge cycling. Thus at low acid molarities typical of the discharge state of a battery the porous organic polymers will have a larger particle size and larger pores as the functional groups associate with the electrolyte. It is believed that the increase in particle size is due to the hydration of the functional groups, which is significantly more pronounced at low acid concentrations as opposed to the high acid concentration representative of a fully charged battery. As set forth above, the porosity of the organic polymers can be microporous including gels, macroporous and combinations of the porosities. It is preferred that the porous organic polymers have microporosity and/or a combination of microporosity with macroporosity, weak acid and/or weak anion functional groups and low cross-linking such as by the various cross-linking agents set forth above. It is preferred that the amount of cross-linking in the porous polymer is less than about 10% preferably less than 8% and still more preferably less than 4%. Further, as set forth above, the weakly acidic functional groups are preferred particularly the carboxylic functional group. The above preferred properties of the porous organic polymers and functional groups improve the overall change in particle size and pore size, i.e. increases such changes when comparing the particle sizes at the conditions of acid molarity during discharge and charge.

It has been found that the ability of the particle size to be larger at discharge conditions of the battery alters the porosity of the separator and controls the oxygen transport from the positive plate to the negative plate for recombination particularly during the charging regime wherein excessive oxygen transport to the negative plate reduces and/or adversely effects the ability of the negative plate to be recharged fully, i.e. the production of water from oxygen becomes preferential over the conversion of lead sulfate to sponge lead in the negative plate. Further, the porous organic polymers have functional groups which are typically of hydrophilic character and porosity, which allows for improved distribution of the electrolyte in the separator and overall improvement in electrolyte utilization in the battery.

Any suitable positive active electrode material or combination of such materials useful in lead-acid batteries may be employed in the present invention. The positive active electrode material can be prepared by conventional processes. For example, a positive active electrode material precursor paste of lead sulfate and litharge (PbO) in water can be used, or conventional pastes, such as those produced from leady oxide, sulfuric acid and water, can be used. After the paste is applied to the grid material, it is dried and cured. The precursor paste may be converted to lead dioxide by applying a charging potential to the paste.

Any suitable negative active electrode material useful in lead-acid batteries may be employed in the present invention. One particularly useful formed negative active electrode material comprises lead, e.g., sponge lead. Conventional lead paste prepared from leady oxide, sulfuric acid, water and suitable expanders can be used.

Each of the cells of a lead acid battery further includes a non-electrically conductive separator acting to separate the positive and negative electrodes of the cell and to hold electrolyte. Any suitable material may be used as a separator provided that it has no substantial detrimental effect on the functioning of the cells or battery. Typical examples of separator material for batteries include glass fiber, sintered polyvinyl chloride and microporous polyethylene, which have very small pore sizes. Certain of these separators are formed as envelopes, with the pasted plates inside and the separator edges sealed permanently. Typically only the positive plates are encased in the separator. Separators uses for sealed lead-acid batteries operating on the oxygen recombination principle, i.e., oxygen recombinant batteries include one or more layers of silica-based glass, preferably separators formed of a highly absorptive porous mat of acidwettable binder free microfine glass fibers. Typically, a mix of fibers may be employed whose individual fibers have an average diameter in the range of a bout 0.2 to about 10 microns, more preferably about 0.4 to 5.0 microns, with possible minor amounts of larger gauge fibers to facilitate production of the mat. The porosity is preferably high, more preferably in the range of about 80% to about 98% and still more preferably about 85% to about 95%, if in the compressed state in the cell (slightly higher in the uncompressed state). The separator preferably has a relatively high surface area, more preferably in the range about 0.1 to about 20 m2/g, which facilitates the absorption and retention of relatively large amounts of acid electrolyte volumetrically while, if desired, still having a substantial unfilled pore volume permeable to oxygen for transport directly through the separator for consumption at the negative electrode. The particularly preferred separator materials have a surface area as measured by the BET method of in the range about 0.2 to about 3.0 m2/g., 30 especially about 1.0 to about 2.0 m2/g.

As set forth above metal impurities are particularly detrimental in sealed lead acid batteries operating on the oxygen recombination principal, i.e. recombinant batteries. A number of impurity metals can exert a deleterious effect on the performance of recombinant batteries by for example, effecting one of more of the performance requirements of the recombinant batteries such as by increasing oxygen, evolution at the positive electrode, increasing hydrogen evolution at the negative electrode, inhibiting oxygen recombination at the negative electrode and in increasing the amount of water lost by the battery. Typical examples of metals that are particularly deleterious in recombinant batteries are arsenic, antimony, cobalt, chromium, nickel and tellurium.

As set forth above, the metal impurity inhibiting additives can be incorporated directly into the positive active material or negative active material for reducing the detrimental effects of the soluble metal impurity on the negative plates. Further, the metal impurity inhibiting additives, as set forth above, can be coated on the separator such as the glass fiber mats used in lead acid batteries. Further, the metal impurity inhibiting additives can be incorporated into the porous polymeric separators, such as polyvinyl chloride and microporous polyethylene. Typical concentrations of the additives associated with the separator is less than about 10 wt % preferably less than about 5 wt % basis the weight of the separators. The preferred metal impurity inhibiting additives are the porous organic polymers, which allow for the inhibiting effect of the additives while not detrimentally adversely effecting the flow of electrolyte from and/or through the separator to the positive and negative plates.

As set forth above, the organic polymers containing functional groups for controlling oxygen during the oxygen recombination cycle and providing for improved electrolyte distribution in the separator are incorporated into the recombinant battery separator. The separators can be for example porous mats and/or felts having microfine fibers typically glass fibers, organic fibers and/or mixtures of the combination of fibers. The fiber mats have an unfilled pore volume, which allows oxygen to be transported directly though the separator for consumption at the negative electrode. State of the art separators can be manufactured binder free and/or with binder. Battery separators of this type can be manufactured on paper making machines or in combination with a conventional melt blowing apparatus to produce polymer filaments which are deposited on a moving conveyer to form a flat mat or felt.

In another aspect for manufacturing tin dioxide coated porous substrates, the process comprises contacting a porous substrate with a composition comprising a tin oxide precursor, such as tin chloride forming components, including stannic chloride, stannous chloride, tin complexes and mixtures thereof, preferably stannous chloride, at conditions, preferably substantially non-deleterious oxidizing conditions, more preferably in a substantially inert environment or atmosphere, effective to form a tin oxide precursor-containing coating, such as a stannous chloride-containing coating, on at least a portion of the substrate. The substrate is preferably also contacted with at least one dopant-forming component, such as at least one fluorine component, at conditions, preferably substantially non-deleterious oxidizing conditions, more preferably in a substantially inert atmosphere, effective to form a dopant forming component-containing coating, on at least a portion of the substrate. The coated porous particles are particularly useful in a number of applications, particularly lead acid batteries, for example, monopolar and bipolar batteries, catalyst, resistance heating elements, electrostatic dissipation elements, electromagnetic interference shielding elements, electrostatic bleed elements, protective coatings, field dependent fluids and the like. In practice the particles, which are preferred for use in such applications in general have an average length in the range of from about 20 microns to about 7 mm and an average thickness in the range of from about 20 microns to about 7 mm, the average length and thickness being different or the same depending on particle geometry and application.

As set forth above, the substrate can be optimized for a particular application and the particular electrical and/or mechanical requirements associated with such end use application. For example, in applications in which the particles are combined with other materials, such as polymers and positive active material of a lead acid battery and depending on the requirements of the application, ranges of from about 3 microns to about 300 microns, or even less than about 5 microns, typically ranges of from about 3 microns to about 150 microns or from about 5 microns to about 75 microns are useful. The porous inorganic substrates, can be characterized by bulk density (gm/cc) which is the weight or mass per unit volume considered only for the particle itself, i.e., includes the internal pore volume, surface area (M2/gm), total pore volume (cc(hg)/gm), pore size distribution and percent apparent porosity. In general, it is preferred that the bulk density be from about 3% to about 85% more preferably from about 10% to about 70%, more preferably, from about 10% to about 60% of the true density of the substrate material. Bulk densities less -than about 5% are also useful. In addition, the porous substrate can have a wide range of surface area (M2/gm) of from about 0.01 to about 700 preferably having a moderate to high surface area, preferably, from about 10 M2/gm to about 600 M2/gm, more preferably, from about 50 M2/gm to about 500 M2/gm.

The pore volume is preferably from about 0.4 cc/gm to about 3.5 cc/gm, or even up to about 5 cc/gm, more preferably from about 0.7 cc/gm to about 4.5 cc/gm more preferably from about 0.7 cc/gm to about 3.25 cc/gm. The pore size distribution can vary over a wide range and can have various distributions including multi-modal, for example, bi-modadistribution of pores including macro pores and micro pores. There ideally exists a relationship between pore diameter, surface area and pore volume, thus fixing any two variables generally determines the third. In general, the mean (50%) pore diameter for macro pores, i.e., generally classified as having a pore diameter greater than about 750 angstroms can vary from about 0.075 microns to about 150 microns, more preferably, from about 0.075 microns to about 10 microns. Micro porosity, generally classified as a porosity having a mean pore diameter of less than about 750 angstroms can vary over a wide range. In general, the mean pore diameter for micro porosity can vary from about 20 angstroms to about 750 angstroms, more preferably, from about 70 angstroms to about 600 angstroms. The ratio of macro to micro porosity can vary over a wide range and depending on the application, can be varied to provide optimized performance as more fully set forth under the various applications. In general, the ratio of percent macro porosity to micro porosity expressed as that percent of the total porosity can vary from about 0% to about 95%, more preferably, from about 5% to about 80% macro porosity and from about 100% to about 5%, more preferably from about 95% to about 20% micro porosity.

As set forth above, the porous substrate can be inorganic for example, carbon and carbide, i.e., silicon carbide, sulfonated carbon and/or an inorganic oxide. Typical examples of inorganic oxides which are useful as substrates include for example, substrates containing one or more alumino silicate, silica, alumina, zirconia, magnesia, boria, phosphate, titania, ceria, thoria and the like, as well as multi-oxide type supports such as alumina phosphorous oxide, silica alumina, zeolite modified inorganic oxides, e.g., silica alumina, perovskites, spinels, aluminates, silicates, e.g., zirconium silicate, mixtures thereof and the like. A particularly unique porous substrate is diatomite, a sedimentary rock composed of skeletal remains of single cell aquatic plants called diatoms typically comprising a major amount of silica. Diatoms are unicellular plants of microscopic size. There are many varieties that live in both fresh water and salt water. The diatom extracts amorphous silica from the water building for itself what amounts to a strong shell with highly symmetrical perforations. Typically the cell walls exhibit lacework patterns of chambers and partitions, plates and apertures of great variety and complexity offering a wide selection of shapes. Since the total thickness of the cell wall is in the micron range, it results in an internal structure that is highly porous on a microscopic scale. Further, the actual solid portion of the substrate occupies only from about 10–30% of the apparent volume leaving a highly porous material for access to liquid. The mean pore size diameter can vary over a wide range and includes macroporosity of from about 0.075 microns to 10 microns with typical micron size ranges being from about 0.5 microns to about 5 microns.

As set forth above, the diatomite is generally amorphous and can develop crystalline character during calcination treatment of the diatomite. For purposes of this invention, diatomite as produced or after subject to treatment such as calcination are included within the term diatomite.

The particularly preferred macroporous additives for use in the separator elements of this invention are diatomites obtained from fresh water and which have fiber-like type geometry. By the term fiber-like type geometry is meant that the length of the diatomite is greater than the diameter of the diatomite and in view appears to be generally cylindrical and/or fiber-like. It has been found that these fiber-like fresh water diatomites provide what is believed to be an electrolyte pumping type action, which provides for improved distribution of sulfuric acid electrolyte in the recombinant type separator.

As set forth above, porous substrate particles can be in many forms and shapes, especially shapes which are not flat surfaces, i.e., non line-of-site materials such as pellets, extrudates, beads, including spheres, flakes, aggregates, rings, saddles, stars and the like. The percent apparent porosity, i.e., the volume of open pores expressed as a percentage of the external volume can vary over a wide range and in general, can vary from about 20% to about 92%, more preferably, from about 40% to about 90%. In practice, the bead particles, including spheres, which are preferred for use in certain applications in general have a roundness associated with such particles generally greater than about 70% still more preferably, greater than about 85% an still more preferably, greater than about 95%. The bead products of this invention offer particular advantages in many of such applications disclosed herein, including enhanced dispersion and rheology.

Acid resistant inorganic substrates, especially fibers, flakes, and glass fibers, are particularly useful substrates, when the substrate is to be used as a component of a battery, such as a lead-acid electrical energy storage battery.

The porous substrate for use in lead-acid batteries, because of availability, cost and performance considerations, generally comprises acid resistant glass, and/or ceramics more preferably in the form of particles, for example, fibers, and/or flakes, and/or beads including spheres and/or extrudates as noted above. The solid substrates including organic polymers for use in lead-acid batteries are acid resistant. That is, the substrate exhibits some resistance to corrosion, erosion, oxidation and/or other forms of deterioration and/or degradation at the conditions present, e.g., at or near the positive plate, negative plate or positive or negative side of bipolar plates or separator, in a lead-acid battery. Thus, the substrate should itself have an inherent degree of acid resistance. If the substrate is acid resistant, the physical integrity and electrical effectiveness of the whole present battery element, is better maintained with time relative to a substrate having reduced acid resistance. If glass or ceramic is used as the substrate particle, it is preferred that the glass has an increased acid resistance relative to E-glass. Preferably, the acid resistant glass or ceramic substrate is at least as resistant as is C-or T-glass to the conditions present in a lead-acid battery. Preferably the glass contains more than about 60% by weight of silica and less than about 35% by weight of alumina, and alkali and alkaline earth metal oxides.

As set forth above, one of the preferred applications for use of the porous substrates is in lead acid batteries. Thus, the substrates can be added directly to the positive active material of a lead acid battery, i.e., the positive electrode to improve battery performance, particularly positive active material utilization efficiency. One particular, unique aspect of the porous substrates is that the substrate is able to provide an internal reservoir for holding sulfuric acid electrolyte required for carrying out the electrochemical reactions in the positive active material. More particularly, the porosity improves overall, high rate performance of the positive active material, i.e. improved utilization efficiency at varying rates of discharge time, including high rates and at short discharge times.

As set forth above, the physical properties of the porous substrates can vary widely. It is preferred that the substrate have sufficient macro porosity and percent apparent porosity to allow for the utilization of the electrolyte sulfuric acid contained in the pores during discharge of the positive active material and, in addition, that the bulk density be selected to reduce the overall weight of the positive active material while enhancing the overall performance of the battery. In general, the preferable percent apparent porosity can vary from about 40% to about 92%, more preferably, from about 70% to about 90%. The preferred ratio of percent macro porosity to percent micro porosity can vary over a wide range and in general is from about 20% to about 95% macro porosity, more preferably, from about 45% to about 90% macro porosity with the balance being micro porosity. The mean pore diameter, particularly mean macro pore diameter, can vary over a wide range with the utilization of electrolyte during the condition of the discharge of the battery being an important factor i.e., at high rate discharges, such as cold cranking, high macro porosity is preferred. Preferred mean macro pore diameter is from about 1 micron to about 150 microns, more preferably, from about 5 to about 100 microns or even from about 0.075 micron to about 10 micron and still more preferably from about 0.1 to about 5 microns.

As set forth above, a particularly preferred substrate is a porous particle, i.e. porous support, particularly beads, including spheres, extrudates, pellets, rings, saddles, stars, etc., preferably within the bulk density, macro porosity, micro porosity, apparent percent porosity and surface areas as set forth above. The coated particles can provide improved performance in various applications, particularly, in the positive active material of lead acid batteries. As set forth above, the porous substrate can provide a reservoir for electrolyte sulfuric acid, which participates in the electrochemical reaction during discharge of the positive active material. A particularly unique embodiment of the present invention is the use of the porous substrate itself as an additive in the positive active material to provide a reservoir of electrolyte sulfuric acid while providing a light weight additive for incorporation into the positive active material. Such particles are porous and within the ranges as set forth above particularly the preferred ranges. Such porous substrates can be further coated with additional components such as with other surface components, which may improve recharge, i.e. oxidation as well as other conductive components. As set forth above, the porous substrate with or without an additional component provides unexpected improvement in the performance of the positive active material, particularly, in the high rate discharge conditions such as cold cranking under lower than ambient temperature conditions.

Another particularly unique embodiment of the present invention is the use of the porous substrate itself as an additive in the negative active material to provide a reservoir of electrolyte sulfuric acid while providing a lightweight additive for incorporation into the negative active material. Such particles are porous and within the ranges as set forth above for the porous substrates particularly the preferred ranges. Such porous substrates can be further coated with additional components such as other surface components, which may improve recharge, discharge and/or overall life of the battery, such as conductive components which are stable at the conditions of the negative electrode such as carbon and conductive metals, which coated porous substrates are included within the scope of this invention and the term porous substrate. The porous substrate with or without an additional component provides unexpected improvement in the performance of the negative active material particularly under cold cranking conditions particularly multiple cold cranking under lower that ambient temperature conditions. As set forth above, the porous substrate can provide unexpected improvement in cold cranking typically 0 degrees F or lower during a series of multiple cold cranking. In addition, the porous substrates in the negative active material can provide for improved active material surface area maintenance and active material morphology maintenance particularly at elevated temperatures such as from about 60–80 degrees C or higher.

Typically, the porous substrates with or without additional components are incorporated into the positive and negative active material typically at a concentration of up to about 5-wt %, typically up to about 3-wt % basis the active material.

As set forth above, it is preferred that the porous substrate particles have sufficient macroporosity and percent apparent porosity for the utilization of the electrolyte sulfuric acid contained in the pores during discharge of the active material. Further, as set forth above, the preferred mean macropore diameter is from about 0.075 microns to about 10 microns and still more preferably from about 0.1 to about 5 microns. Particularly preferred solid porous particles that exhibit sufficient macroporosity to allow for improved utilization of sulfuric acid electrolyte are silica containing inorganic oxides preferably diatomites particularly those as set forth above and organic based materials particularly polyolefins still more preferably polypropylene.

The particularly preferred macroporous particles for use in the recombinant battery separators of this invention are those within the macroporosity ranges set forth above and those derived from fresh water diatomites having a fiber-like porous structure and organic based macroporous particles also having an elongated type geometry, i.e. the average length of the particle is greater than the average diameter of the base particle. It has been found that the macroporosity and the fiber-like and/or elongated geometry allows for rapid equilibration of the electrolyte in the separator and for reducing the adverse effects caused by stratification of the electrolyte in recombinant separators in valve regulated lead acid batteries.

As set forth above, the porous substrates are acid resistant and include a wide variety of materials, including inorganic and organic based materials. The porous substrates can be in a wide variety of shapes, including shapes that are reduced in size during the manufacture of the positive active material, such as in the blending and/or mixing of the porous substrate in positive active material manufacture. It is preferred that the resulting particles if reduced in size maintain porosity parameters within the ranges as set forth above. It is also preferred, that the particles have sufficient stiffness and or resistance to detrimental permanent deformation in order to maintain sufficient porosity for the sulfuric acid in the pores to participate in a number of repetitive discharge and charge cycles, such as greater than 50 cycles or even 100 cycles.

Further unique embodiment of the present invention is the use of a resilient organic porous substrate which resists detrimental permanent deformation, maintains sufficient porosity for the sulfuric acid in the pores, has resiliency to be deformed under the conditions of discharge particularly mechanical forces in the active material of the lead acid battery and has resiliency to approach or attain its original geometry upon recharge of the battery. In a lead acid battery, the densities of the active material change i.e. lead at a density of 11.34 gram/cc, lead peroxide at a density of 9.4 grams/cc, (negative and positive plate respectively) change during discharge of the battery to lead sulfate having a density of 6.2 grams/cc i.e. lead sulfate. Upon recharge, the lead sulfate is converted back to lead and lead peroxide in the negative and positive plates respectively. The resilient organic porous substrates have the ability to be deformed during discharge and approach or attain their original geometry during recharge of the battery. The changes in density and the ability of the porous substrate to be deformed allows for increased availability and a greater amount of sulfuric acid from the pores of the substrate as a function of time to participate in a number of repetitive discharge and charge cycles leading to increased utilization efficiency. Typical examples of resilient organic porous substrates are elastomeric or rubber-like porous substrates wherein the pores allow the sulfuric acid to participate in discharge and charge cycles. Further examples of such organic resilient porous substrates are organic polymers including for example organic polymers selected from the group consisting of polyolefins, polyvinyl polymers, -phenol formaldehyde polymers, polyesters, polyvinylesters, cellulose and mixtures thereof. The polymers are selected to be acid resistant and compatible with the active material at the conditions of the electrode in which they are in contact. Various resilient organic porous substrates particularly porous particles can be produced using suspension polymerization of a dispersed phase consisting of monomers, cross-linking agents, initiators i.e. catalysts and a co-solvent that functions to aid pore formation. The particle size, pore volume, pore size distribution and macroporosity can be varied within the ranges as set forth above. Such resilient organic porous substrates including particles as set forth above have geometries and are typically used within the ranges as set forth above for the coated porous substrates, particularly the preferred ranges and, as set forth above, as to their use in positive active and negative active material. Depending on the particular active material in which such resilient porous substrates are incorporated, such porous substrates can be further coated with additional components such as with other surface components, which may improve overall properties such as discharge, recharge and life of the active materials.

The particularly preferred organic macroporous particles for use in the recombinant battery separators of this invention are those that are resilient. The resilient macroporous particles resist detrimental permanent deformation and maintain sufficient porosity for the sulfuric acid in the pores. Further, the resiliency allows the particles to be compressed under the separator compression pressures that are used in recombinant batteries and to have improved wet compression resistance under compression loads. Thus, the resiliency of the macroporous particles allows the separator to be compressed and for the macroporous particles to exert a positive pressure against the positive and negative plates of the recombinant battery thereby providing an improvement in the life of the recombinant battery by reducing the tendency of the active material to shed from the positive and negative plates as the separator compression is reduced over the life of the battery.

As set forth above, the porous substrates including resilient porous substrates can be incorporated into the positive and negative active material. The various porous substrates provide a reservoir of electrolyte sulfuric acid in the active material. The reservoir of sulfuric acid in the porous substrates can be added to the porous substrate prior to the addition of the porous substrate to the positive and negative active material or incorporated into the porous substrate from the sulfuric acid electrolyte present in the lead acid battery. Further, other liquids such as water can be substituted for sulfuric acid if a liquid is added to the porous substrate prior to the addition of the porous substrate to the active material. As is recognized by those of skill in the art, only liquids which do not have an adverse detrimental effect on the performance of the battery should be added to the porous substrate prior to addition to the active material.

In a still further embodiment and as is set forth above, the porous substrate particles can be coated with another material. One such material is a component which gives hydrophobic character to the porous substrate, i.e. the porous substrate with the component is not water wet to the same degree as without the component. Such change to hydrophobic character can enhance the flow of electrolyte within the active material by limiting the bonding of the active material to the pores present in the porous particles and to particle surfaces. A particularly preferred component is a silica based size having hydrophobic alkyl groups such as methyl, ethyl or isooctyl which provide for hydrophobic character on the surface of the porous particles. Many of the organic porous particles within the scope of this invention have inherent hydrophobic properties such as the polyolefins whereas others have a combination of hydrophilic and hydrophobic properties. As set forth above, it is preferred that the porous particles have sufficient hydrophobic character to reduce the permanent bonding of the active material to the surfaces of the porous particles particularly the pores of the particles. The reduced bonding of the active material to the porous particles allows for improved diffusion of the sulfuric acid electrolyte to the interior of the active material associated with the positive and/or negative plate.

Further, the macroporous particles for use in recombinant separators have significantly improved controlled wetting by sulfuric acid electrolyte at the varying acid molarities of the lead acid battery when the macroporous particles have at least a part hydrophobic character, for example, a combination of hydrophilic and hydrophobic properties and wherein the hydrophobic character allows for a reduction in permanent bonding to other solid type material used in lead acid batteries particularly the various fiber type material that makes up the recombinant separator.

As set forth above, the particularly preferred macroporous particles are those derived from fresh water diatomites having a fiber-like such as cylindrical-like porous structure and organic porous polymers having an elongated structure wherein the porosity is macroporosity and the particles have at least part hydrophobic character to provide controlled wetting by the sulfuric acid electrolyte and a reduction in any bonding of the macroporous particles to the recombinant battery separator. Further, it is preferred that the macroporous additives be incorporated into the recombinant battery separator while minimizing the use of any binder preferably no binder.

As set forth above, the additives are typically incorporated into the positive and negative active material at a concentration of up to about 5-wt %. The porous particle additives and the antimony inhibiting additives are incorporated during battery manufacture preferably during the production of the paste prior to application on the grid material. The additives can be incorporated into, for example, the lead, leady oxide powders to which the sulfuric acid and water are added. Alternatively, the additives can be mixed into the precursor paste prior to applying on the grid material. It is preferred that the additives be incorporated such as to provide a uniform distribution of the additive particles throughout the entire paste, active material.

Further, the porous substrate as set forth above can be an acid resistant organic material, including organic polymeric materials as set forth above. Preferred polymers are polyolefin polymers, polyvinyl polymers, phenolformaldehyde polymers, polyesters, polyvinylesters and mixtures thereof. Preferred polymers are polyolefins, preferably polypropylene, phenolformaldehyde polymers and polyvinylester, particularly modacrylic polymers.

EXAMPLE 1

A separator battery element is manufactured from a glass-mat having a nominal thickness of 48 mils and a microporous rubber separator having a thickness of 85 mils. The glass-mat and rubber separator have a mean pore diameter less than 5 microns. A powdered organic polymer having a size distribution of from 50 to 125 microns prepared from polystyrene and cross-linked with divinylbenzene having amino methylene phosphonic functional groups, is sprayed onto the glass-mat in an aqueous slurry. A noninterfering polymer is incorporated into the slurry and has an electrostatic charge opposite that of the metal inhibiting polymer. The charge differences allow the formation of a porous floc on the glass-mat.

The glass-mat and separator are combined by the application of an adhesive followed by mat compression. The organic polymer having the phosphonic functional groups is on the interior of the glass-mat facing the inner surface of the separator. The separator is assembled into a 12-volt battery with 6% antimony grids for positive plates and negative grids containing no antimony. Trace amounts of nickel are also present in the lead. The detrimental effects of nickel and antimony on the negative plate are inhibited by the additive in the separator.

EXAMPLE 2

A separator battery element is manufactured from a glass-mat having a nominal thickness of 48 mil. and a microporous polyethylene separator having a thickness of 85mils. The glass-mat and separator have a mean pore diameter less than 5 microns. A powdered organic polymer having a size distribution of from 50 to 125 microns prepared from polystyrene and cross-linked with divinylbenzene having gem phosphonic functional groups, is sprayed onto the glass-mat in an aqueous slurry. A noninterfering polymer is incorporated into the slurry and has an electrostatic charge opposite that of the metal inhibiting polymer. The charge differences allow the formation of a porous floc on the glass-mat. The glass-mat and separator are combined by the application of an adhesive followed by mat compression. The organic polymer having the phosphonic functional groups is on the interior of the glass-mat facing the inner surface of the separator. The separator is assembled into a 12-volt battery with 6% antimony grids for positive plates and negative grids containing no antimony. Trace amounts of nickel is also present in the lead. The detrimental effects of nickel and antimony on the negative plate are inhibited by the additive in the separator.

EXAMPLE 3

The separator element of example 1 was modified by using a second microporous glass-mat as a replacement for the rubber separator. The separator is assembled into a 12-volt battery using the same negative and positive grid plates as example 1. The detrimental effects of nickel and antimony on the negative plate are inhibited.

EXAMPLE 4

A macroporous amino phosphonic divinylbenzene cross-linked polystyrene additive was compounded with a number of different polymer materials used commercially for the manufacture of battery separators. This additive was designed at a particle size distribution to provide increased surface area for the additive and to be electrolyte accessible in the separator polymer matrix.

The porosity of the polymeric matrix was designed so that the additive was present in the channels and pores of the separator and was accessible to the electrolyte as opposed to the additive being totally surrounded and encapsulated by the polymeric matrix. In the latter case the additive would not be accessible to the metal contaminate dissolved in the electrolyte. A number of different polymeric separators were evaluated including a polyethylene separator, a natural rubber compounded separator and a polyvinyl chloride separator. The separators were evaluated in a continuous filtration column in order to determine the binding efficiency and capacity of the additive as a function of the type of additive, it's concentration and the accessibility of the additive in the polymeric matrix to electrolyte.

In the evaluation protocol, two blank polyethylene separators were mounted first on a four-inch diameter filtration column in order to be able to better control the solution flow through the column device.

Solution flow rate was also controlled via a vacuum applied to the collection vessel. The solution flow rate that allowed separators to be characterized for overall metal binding efficiency was 0.5 ml/min. On top of the polyethylene separators was placed four polyvinylchloride (PVC) separators containing 3.9-wt % additive and weighing a total of 15.2 grams. In the apparatus, the PVC separators were caulked with silicone material at the column interface in order to prevent leakage. A stock antimony (III) soln. was used in all evaluations and had a concentration of 20.4 mg/L SB (III) ion in 30-wt. % sulfuric acid. A 1-cm liquid level was maintained on the separator by continuous addition of solution, to provide a constant pressure. The filtrate through the column was monitored every 60 minutes to determine the concentration of antimony in the filtrate. Over the first two and one-half hours, the antimony level in the filtrate was below the detection of the ICP unit. At four and one-half hours, there was a residual concentration of 0.7 mg/L of antimony. This represents a 97% capture efficiency over the last hour on a single pass. The data obtained using the additive at the same concentration as would be present in the separator showed a capture efficiency on 94% on a single pass. In this control evaluation, the additive was distributed on the top of the polyethylene separator followed by applying two standard PVC separators (without additive) in order to hold the additive in place. The conclusions from the test was that the distribution of the additive in the PVC separator was more uniform compared to what can be done in the laboratory with the unincorporated additive.

The major advances that are shown are that the additive is highly efficient for irreversible binding of antimony when incorporated into the PVC separator and that the separator manufacturing procedure provides a very uniform distribution of the additive in the pores and channels typically greater than 1 micron. Furthermore, the additive was highly accessible to the electrolyte. It was also found that a reduced particle size and increased surface area improves overall additive effectiveness.

The test protocol was repeated for a polyethylene separator having relatively small pores and a natural rubber compounded separator. The results on capture efficiency showed a very low capture efficiency for the polyethylene separator compounded with 7.5-wt % additive and a relatively low to moderate capture efficiency for the natural rubber separator which has intrinsic metal control capacity from the rubber. A post mortem analysis was done on both the PVC and polyethylene separator and it was determined that the manufacturing process for the polyethylene separator showed total encapsulation of the additive with very fine pores less than 0.1 microns and that the additive was not substantially electrolyte accessible. The photomicrographs for the PVC separator showed essentially the entire additive particle accessible to the electrolyte within the pores and channels of the separator.

EXAMPLE 5

An evaluation protocol was undertaken to determine the irreversible binding of a metal impurity silver at a typical acid concentration of 38-wt % sulfuric acid. The sulfuric acid solution had 21.4 parts per million (ppm) of silver ion and 1.1 ppm of lead ion. The trace amount of lead ion was added to determine preferential binding of the silver metal ion over soluble lead ion.

To 500 ml of the solution containing the above silver metal impurity and lead ion was added one gram of a divinylbenzene cross-linked polystyrene containing thiouronium functional groups having 50% moisture associated with the macroporosity of the additive. The solution was stirred for 24 hours at ambient temperature and filtered to remove the macroporous additive. An analysis of the filtrate metal concentration showed an 86-wt % metal uptake of silver by the additive with zero uptake of the soluble lead ion. The data shows the irreversible binding of silver to the additive at high hydrogen ion acid concentration with no detrimental binding of the soluble lead ion resent in the sulfuric acid electrolyte.

While this invention has been described with respect to various specific examples and embodiments, it is to be understood that the invention is not limited thereto and that it can be variously practiced within the scope of the following claims.

What is claimed is:

1. A separator useful as an electrolyte reservoir in a valve regulated lead acid battery wherein the separator comprises a plurality of acid resistant three dimensional fiber-like fresh water diatomite macroporous particles to improve participation of electrolyte contained in the separator during repetitive discharge and charge cycles of the battery provided that said freshwater diatomite macroporous particles are associated with said separator and electrolyte accessible.

2. The separator of claim 1 wherein the freshwater macroporous diatomite particles have a mean pore diameter from about 0.075 to about 10 microns.

3. The separator of claim 2 wherein the freshwater diatomite macroporous particles have a mean pore diameter from about 0.1 to about 5 microns.

4. A separator useful as an electrolyte reservoir in a valve regulated lead acid battery wherein the separator comprises a plurality of acid resistant three dimensional elongated resilient organic macroporous polymer particles to improve the resilient compression of the separator during repetitive discharge and charge cycles of the battery provided that said organic macroporous polymer particles are associated with said separator and electrolyte accessible.

5. The separator of claim 4 wherein the organic macroporous polymer particles are selected from the group consisting of a polyolefin, a poly-vinyl polymer, a phenol formaldehyde polymer, a polyester polymer, a polyvinylester polymer and mixtures thereof.

6. The separator of claim 5 wherein the organic macroporous polymer particles are polyolefin and the polyolefin is polypropylene.

7. The separator of claim 6 wherein the organic macroporous polymer particles have a mean macropore diameter from about 0.075 to about 10 microns.

8. The separator of claim 4 wherein the organic macroporous polymer particles have a mean macropore diameter from about 0.075 to about 10 microns.

9. A glass fiber mat separator useful as an electrolyte reservoir in a valve regulated lead acid battery wherein the glass fiber mat separator comprises a plurality of acid resistant three dimensional fiber-like fresh water diatomite macroporous particles to improve participation of electrolyte contained in the separator during repetitive discharge and charge cycles of the battery provided that said freshwater diatomite macroporous particles are associated with said separator and electrolyte accessible.

10. The separator of claim 9 wherein the freshwater diatomite macroporous particles have a mean macropore diameter from about 0.075 to about 10 microns.

11. The separator of claim 10 wherein the freshwater diatomite macroporous particles have a mean macropore diameter from about 0.1 to about 5 microns.

* * * * *